United States Patent
Yamamoto et al.

(10) Patent No.: US 7,489,371 B2
(45) Date of Patent: Feb. 10, 2009

(54) DISPLAY MODULE

(75) Inventors: Norio Yamamoto, Tottori (JP); Seiji Morimoto, Tottori (JP)

(73) Assignee: Epson Imaging Devices Corp., Nagano (JP)

( * ) Notice: Subject to any disclaimer, the term of this patent is extended or adjusted under 35 U.S.C. 154(b) by 294 days.

(21) Appl. No.: 11/330,142

(22) Filed: Jan. 12, 2006

(65) Prior Publication Data

US 2006/0170839 A1 Aug. 3, 2006

(30) Foreign Application Priority Data

Jan. 26, 2005 (JP) ............... 2005-017874

(51) Int. Cl.
G02F 1/1333 (2006.01)
(52) U.S. Cl. .......................... 349/58; 349/60
(58) Field of Classification Search ............ 349/58, 349/60
See application file for complete search history.

(56) References Cited

U.S. PATENT DOCUMENTS 6,476,883 B1 * 11/2002 Salimes et al. ............. 349/58
6,844,902 B2 * 1/2005 Inoue ......................... 349/58
2001/0019377 A1 * 9/2001 Fukayama et al. .......... 349/58

FOREIGN PATENT DOCUMENTS

JP 3532315 3/2004

* cited by examiner

Primary Examiner—Frank G Font
Assistant Examiner—Jerry Blevins
(74) Attorney, Agent, or Firm—Westerman, Hattori, Daniels & Adrian, LLP.

(57) ABSTRACT

In a liquid crystal display module, fitting parts 19a for fastening the liquid crystal display module are provided in the corners of a rear case 19 provided with pressings close to the corners thereof, the corners being located toward the inner sections of the rear case, and not at its periphery, whereby plastic support elements 25 are installed to the fitting parts 19a, and mounting brackets 20 for fastening are installed to the rear case via screws that are screwed into screw holes 19b formed in the fitting parts 19a. In this manner, a liquid crystal module for use in a car navigation system, etc., is provided whose fitting portions occupy a small space and can be compactly housed in its onboard location.

3 Claims, 9 Drawing Sheets

DISPLAY MODULE

BACKGROUND OF THE INVENTION

1. Field of the Invention

The present invention relates to a display module, such as a liquid crystal display module, and more particularly to the fitting parts for installing a display module.

2. Background Art

Aside from the fact that they are low on power consumption and are thin and lightweight, liquid crystal display devices have come to be widely used for display equipment because of their portability, such as personal digital assistants (PDAs) and cell phones, and for movable display equipment, such as car navigation systems.

Such liquid crystal display devices normally comprise a liquid crystal display panel, an optical sheet such as a diffusing plate, a prism sheet, a light guide plate, a reflector plate, a plastic frame that encloses the aforementioned items, a lamp set located close to the side edges of the light guide plate, a base plate that houses these items and covers the back of the liquid crystal display device, and a front frame that covers the circumferential front portion of the liquid crystal display panel and the sides of the assembly.

Gate driver ICs and source driver ICs are mounted onto the liquid crystal panel by means of Tape Automated Bonding (TAB) and are driven by a printed circuit board carrying control circuits connected to them.

A liquid crystal display (LC) module used in car navigation systems is hereafter described with reference to FIG. 1, which is an exploded perspective view of the present invention showing the LC module 10 of a car navigation system seen from an angle from below.

The LC module 10 comprises the following component elements which are combined together and housed by a plastic frame 14: an LC panel 11 in which an array substrate and a substrate facing it are adhered together by sealing material and liquid crystal is filled in the space between the two substrates; drive ICs (not shown in the figure) composed of gate driver ICs and source driver ICs for driving the LC panel 11 that are provided directly on the end edges of the array substrate of the LC panel 11 by means of the chip on glass (COG) method; flexible printed circuit (FPC) boards 12a and 12b for connection to a control circuit board (not shown in the drawing) that is connected to the various drive ICs of LC panel 11 and carries controllers and other electronic parts that control such drive ICs; a plurality of optical sheets 15a to 15c disposed on the back surface of the LC panel 11; a rectangular, tabular light guide plate 17 made of acrylate resin; a white reflector plate 18 disposed on the back surface of the light guide plate; and a rear case 19 that covers the back surface of the reflector plate. The top part of the plastic frame 14 supports the LC panel 11, the other structural elements being fitted into the bottom part of the plastic frame 14. To complete the assembly, a front frame 22 is applied to the front of the LC panel 11 so as to fit the rear case 19.

Eaves 23 are located around the light guide plate 17 along its side edges, and a tubular lamp 21 is disposed in a lamp housing 24 that is a gap formed inside the plastic frame 14 by the reflector plate 18 and the eaves 23 of the light guide plate 17. The tubular lamp 21 is disposed in such manner that its light exit surface is parallel to the side edges of the light guide plate 17, which constitute the light entry surfaces of the plate, the plate being made of transparent acrylate resin or like material. The flexible printed circuit boards 12a and 12b wind to the side and the rear of the plastic frame 14, and are connected to a printed circuit board, (not shown in the drawing), that is installed to the back surface of the rear case 19. The printed circuit board is covered by a metallic cover, with an insulating sheet (not shown in the drawing) interposed.

Since liquid crystal display devices are generally used while one is in transit, they must be firmly and compactly made.

Figure 8:
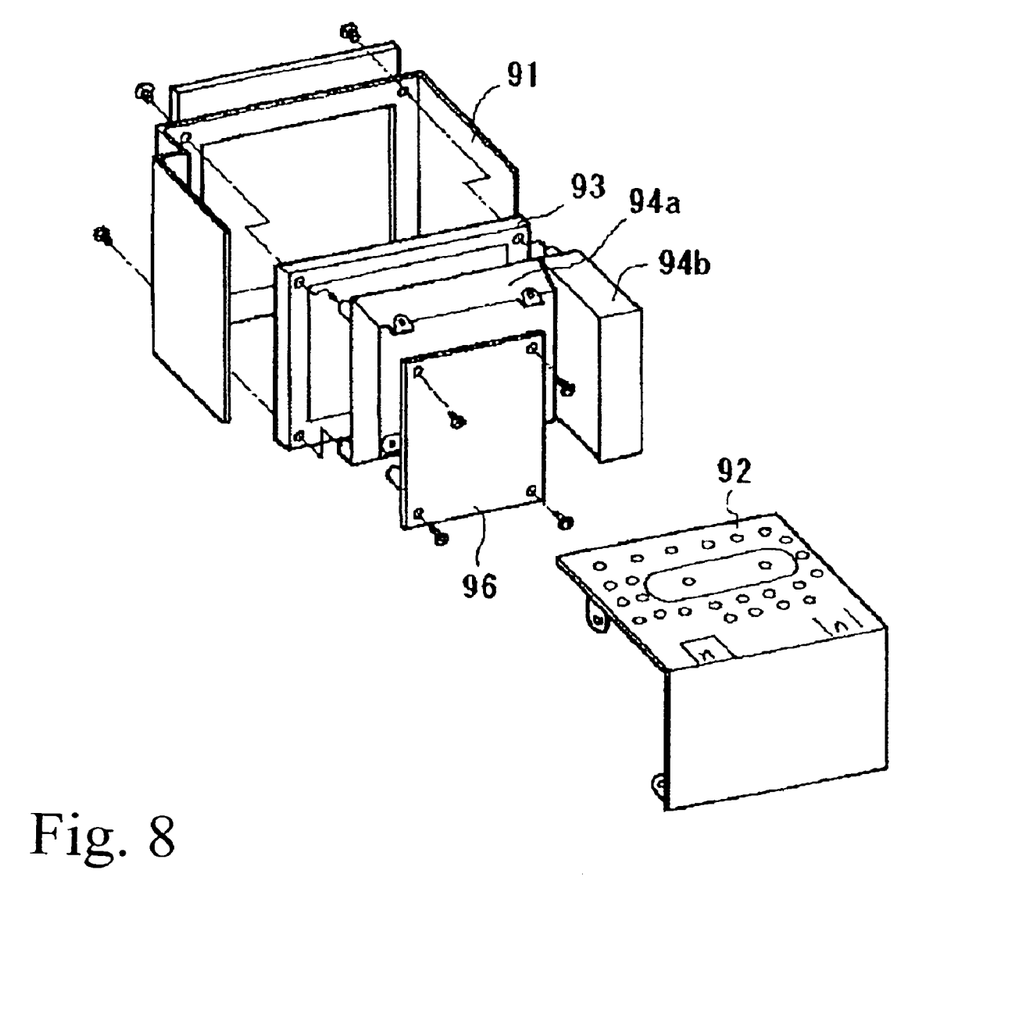
FIG. 8 is an exploded perspective view showing an example of a conventional car navigation system.

In a car navigation system, for instance, the space allotted for their installation is restricted to the space beneath the car's dashboard. In the conventional installation method disclosed in Japanese Patent No. 3532315 (refer to FIG. 8), where specifically, an LC panel 93, a backlight 94a, a heat radiator 94b and a control unit 96 are held in place by being screwed to the mounting frame of a front chassis 91 that encloses them on each side and is itself held in place by the rear chassis 92 of the navigation system provided in the place of installation, a certain amount of depth is required to attach the mounting frame of the front chassis 91 to the rear chassis 92. In other words, an exclusive mounting frame must be configured to have a certain size and depth for fastening the LC module. Designing compact car navigation systems has become an issue considering that their size must conform to the prescribed outer dimensions of their installation location.

Figure 9:
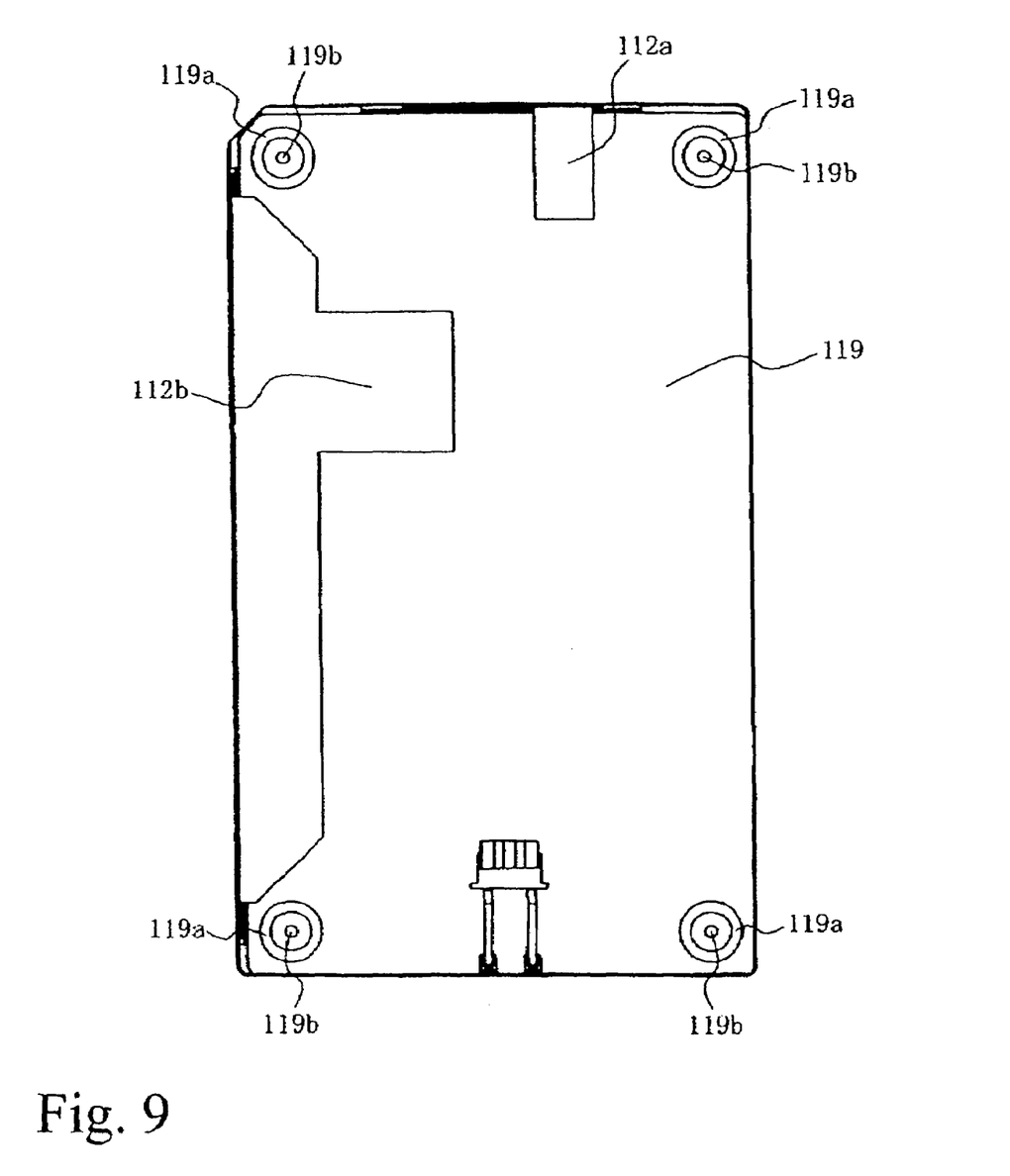
FIG. 9 is a plane view of the back surface of the rear case in a conventional LC module.

In another attaching method illustrated in FIG. 9, four screw holes 119b, into which screws for fastening the chassis frame are screwed, are provided on four corners of the rear case 119, for the purpose of attachment to the vehicle. These portions are formed through a well-known process termed "pressing", whereby a circular dish-shaped die is stamped into the sheet metal of the rear case 119, the screw holes 119b being made in the center of the circular dish-shaped protruding pressed portions 119a that rise up on the back surface. This mode of construction is widely known since it merely involves embossing the rear case.

Although they are disposed as close to the edge of each corner of the rear case 119 as possible, the screw holes 119b must not, for processing reasons, reside excessively close to the edges, since they are formed as circular dish shapes. In addition, the screw holes 119b could obstruct the fastening of the printed circuit board onto which the drive ICs and control circuits, etc., are mounted, and which is installed behind the rear case 119, and the rear cover (not shown in the drawing) that covers it.

In recent years, LC modules have become multi-functional and very advanced, so that various ICs and parts are mounted onto the printed circuit board so as to realize a variety of functions, with the result that the printed circuit board has become enlarged, while the presence of the circular dish shaped screw holes 119b has imposed restrictions on its size and shape. In other words, it has become problematic to secure space for the printed circuit board.

In FIG. 9, the gate drive ICs and source drive ICs (not shown) are connected via flexible printed circuit boards (represented by reference numerals 112a and 112b in FIG. 9) to a printed circuit board (also not shown).

As can be derived from the above, car navigation systems, etc. require a display module that is entirely compact and has fitting portions that occupy a small space.

SUMMARY OF THE INVENTION

The present inventor arrived at the present invention by conducting numerous investigations, following which he focused attention on the corner portions of the rear case of an LC module and found that forming pressed portions of a special structure in such corner portions of the LC module made it possible to utilize these corner portions effectively for screwing onto the mounting brackets, and furthermore allowed the printed circuit board, etc., to be disposed tightly against the rear case of the LC module with ease.

Thus, the object of the present invention is to provide a compact LC module with fitting portions that occupy a small space for use in the display module of car navigation systems and other equipment.

This purpose can be achieved by the following means. Namely, in the first embodiment of the present invention, a display module is equipped with a display panel and a rear case comprising fitting parts for fastening the display module that are provided via a pressing process in the corners of the rear case, such pressing portions being formed at inner sections of the rear case, and not at its periphery.

In the display module of the first embodiment of the present invention, support elements are preferably installed into the fitting parts, and mounting brackets for fastening are installed to the rear case by screws that are screwed into screw holes formed in the fitting parts.

Further, in the display module of the first embodiment of the present invention, the screw holes are preferably located in the planar portion of the fitting parts, such planar portion being partitioned into a stepped rear case inner section and a sidewall-less rear case periphery section, each of which forms roughly half of the periphery of the planar portion.

In the second embodiment of the present invention, an LC module equipped with an LC panel and a rear case housing a reflector plate and light source comprises fitting parts for fastening the LC module that are provided in the corners of the rear case via a pressing process, such pressings being formed at inner sections of the rear case, and not at its periphery.

Likewise in the LC module of the second embodiment of the present invention, support members are preferably installed in the fitting parts, and mounting brackets for fastening are installed to the rear case by screws that are screwed into screw holes formed in the fitting parts.

Further, in the LC module of the second embodiment of the present invention, screw holes are preferably located in the planar portion of the fitting parts, such planar portion being partitioned into a stepped rear case inner section and a sidewall-less rear case periphery section, each of which forms roughly half of the periphery of the planar portion.

Moreover, in the LC module of the second embodiment of the present invention, the support members are preferably bottomed spacers formed with cylindrical depressions for receiving screws, and are inserted between the fitting parts and the reflector plate.

According to the present invention, pressings are omitted from the peripheral portion of the rear case of the fitting parts and are provided in the inner section only thereof, since compact attachment can be achieved, the reason being that the space occupied by the fitting portions can be made smaller, since the fitting parts can be formed in the vicinity of the corners of the rear case, which is not true in the case of conventional attaching methods that require a certain depth, etc.

Furthermore, by virtue of the second embodiment of the present invention, it is possible to suppress the adverse effects that may be caused by dirt entering the fitting parts on the display of an LC module, such as deterioration of the level of brightness of the backlight.

DETAILED DESCRIPTION OF THE PREFERRED EMBODIMENTS

The embodiments of the present invention will be described hereafter with reference to the accompanying drawings. However, the example below merely represents one illustrative example of an LC module embodying the technical idea of the present invention and is not intended to limit the applicability of the present invention to such implementation. The present invention may equally apply in various other cases without departing from the technical idea set forth in the claims.

Figure 1:
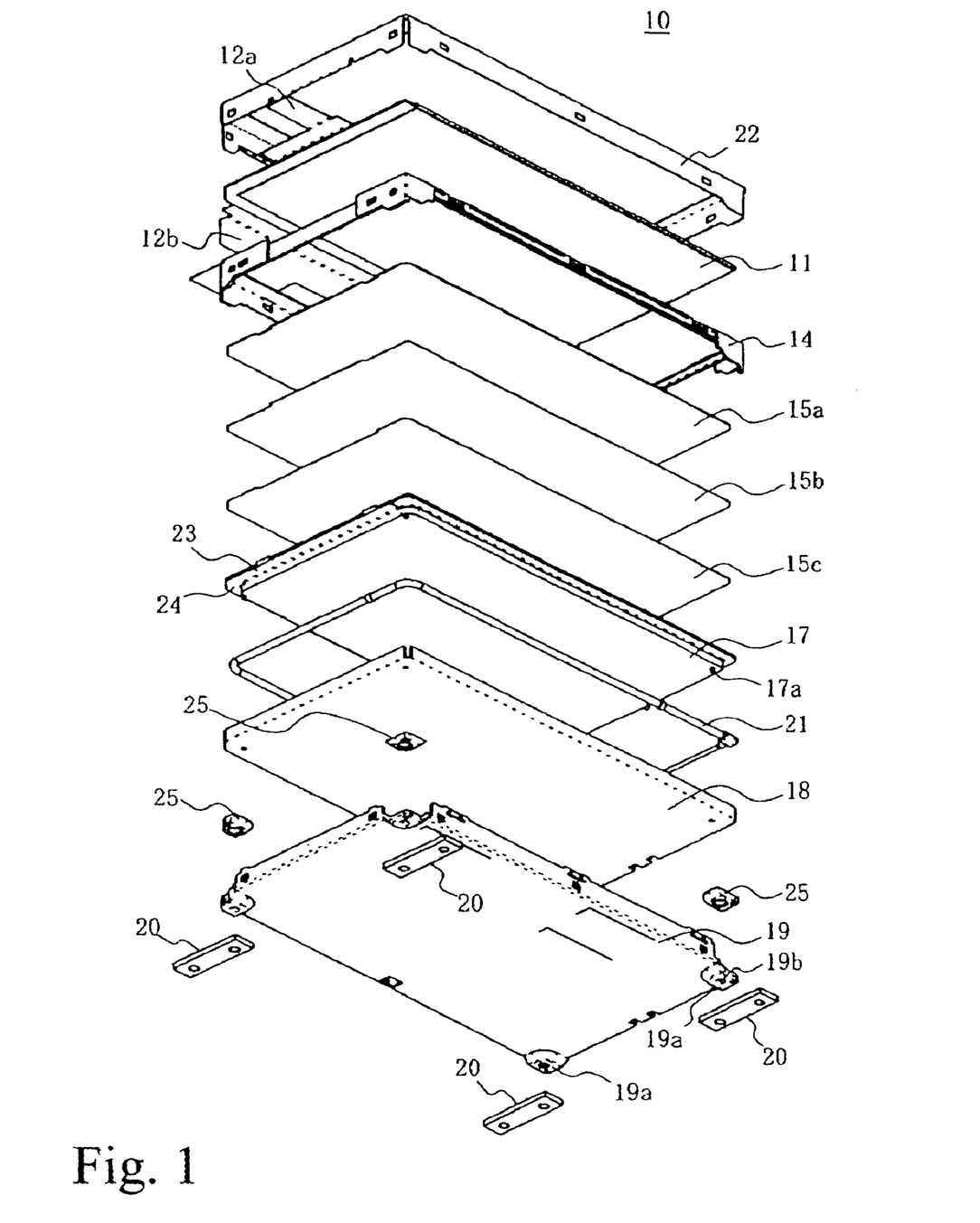
FIG. 1 is an exploded perspective view of an embodiment of the LC module of the present invention.
Figure 2:
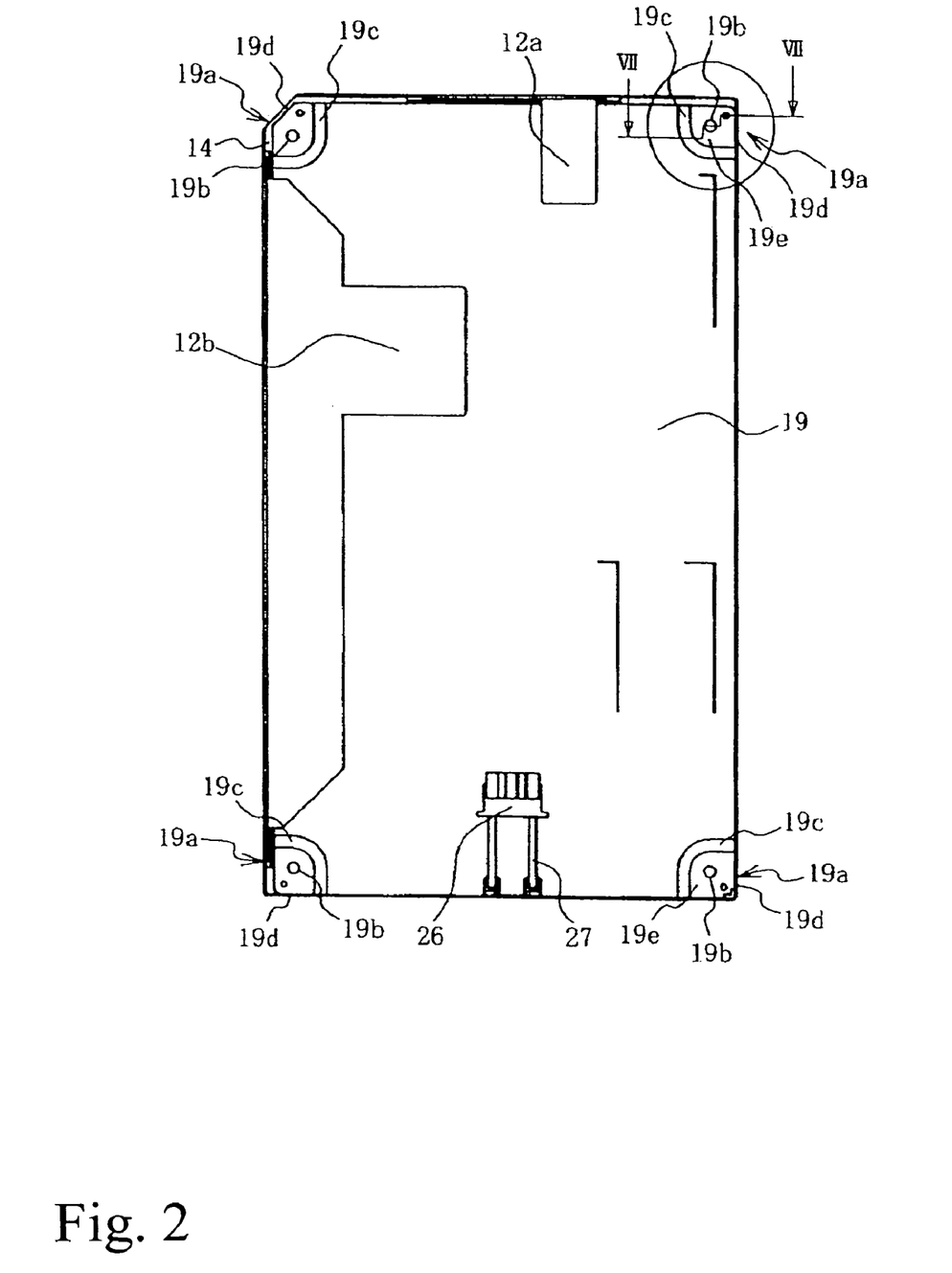
FIG. 2 is a plane view of the back surface of the rear case of an embodiment of the LC module of the present invention.
Figure 3:
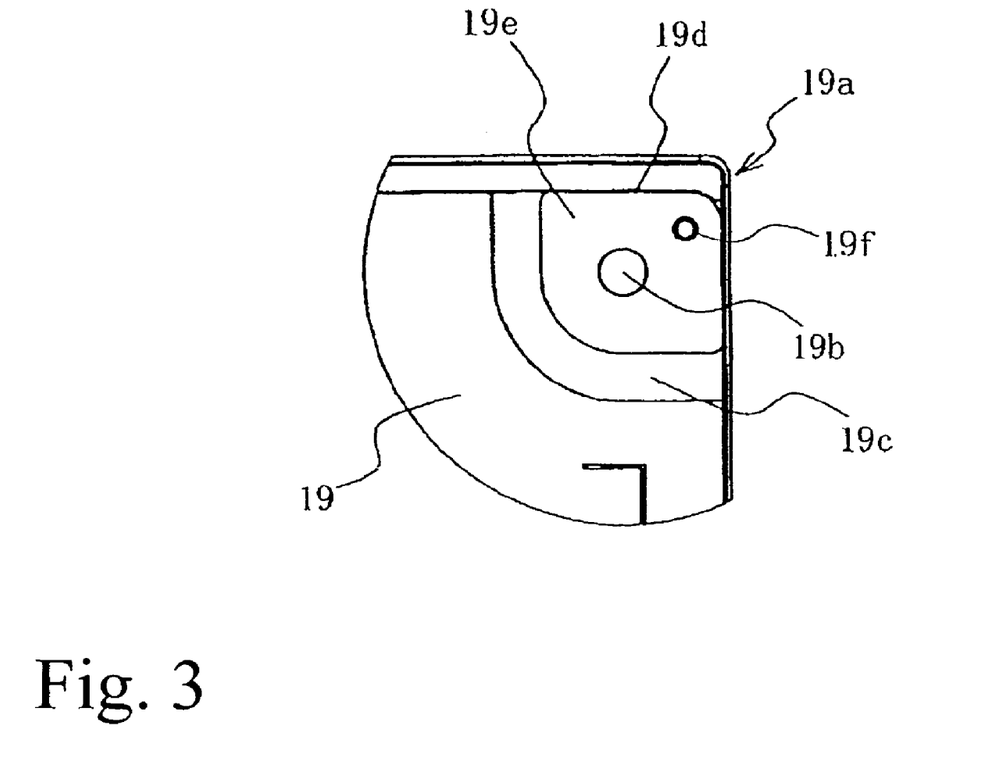
FIG. 3 is an enlarged plane view of a part of FIG. 2.
Figure 4:
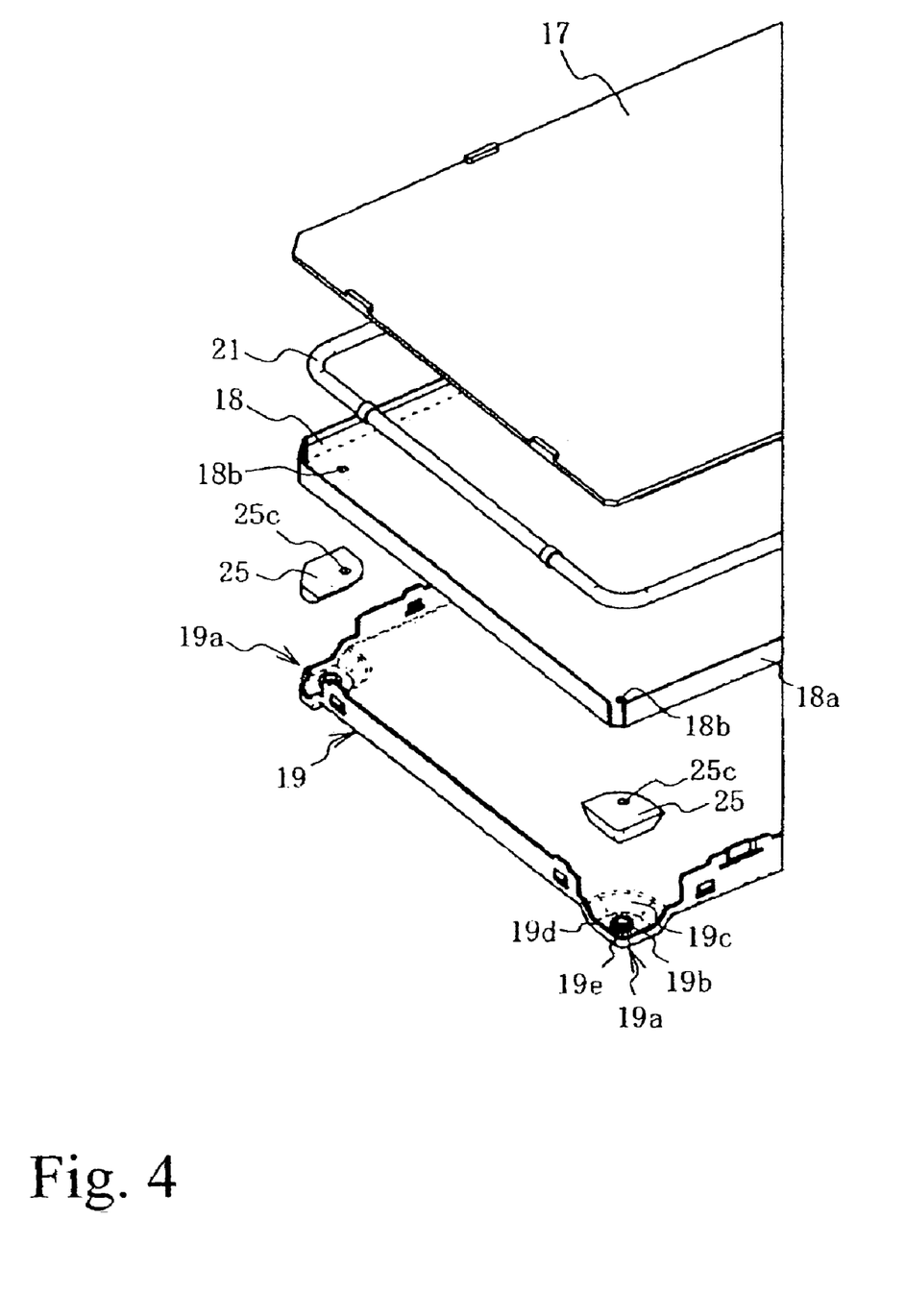
FIG. 4 is an exploded perspective view showing the structure of the backlight part of the LC module.
Figure 5:
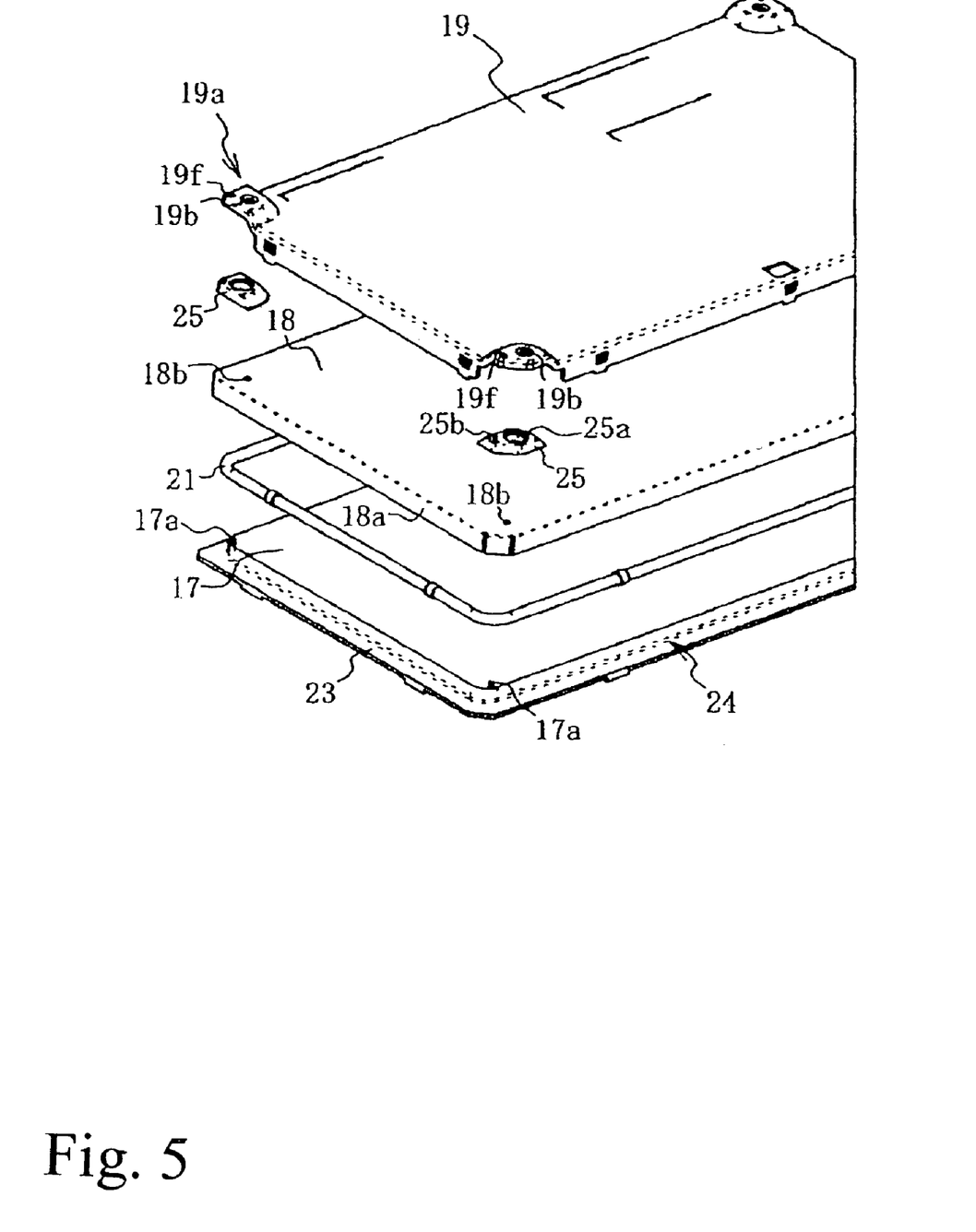
FIG. 5 is an exploded perspective view of a part of FIG. 4 viewed from the opposite direction.
Figure 6:
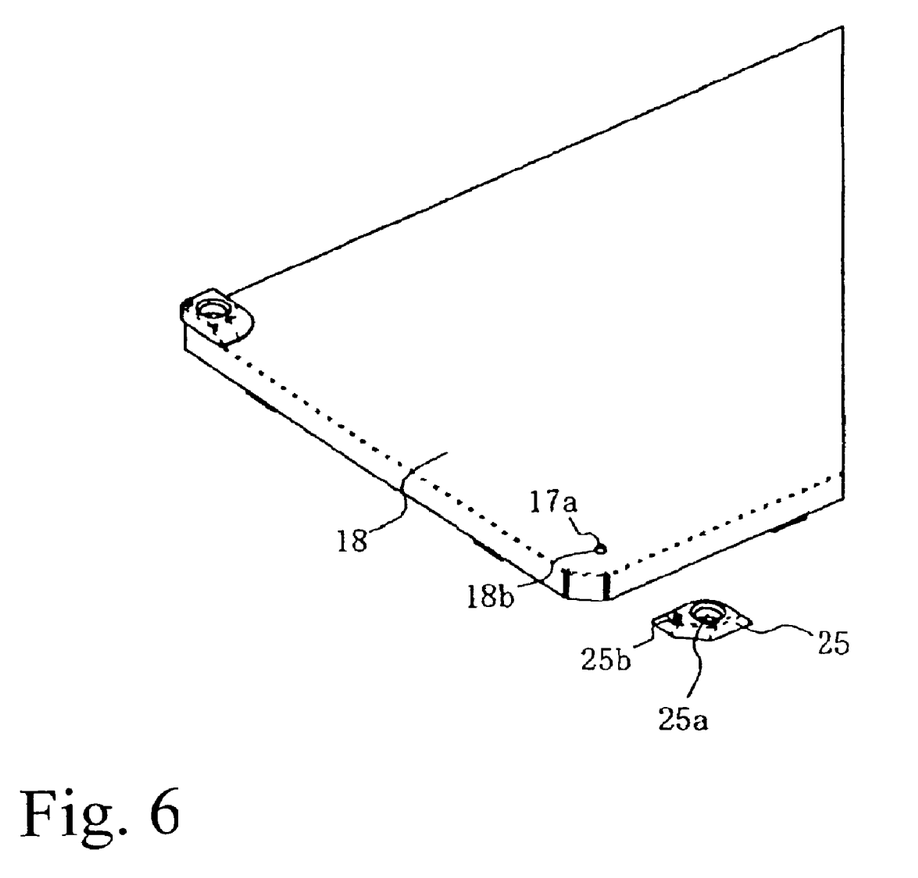
FIG. 6 is a perspective view showing the light guide plate and reflector plate in their assembled state.
Figure 7:
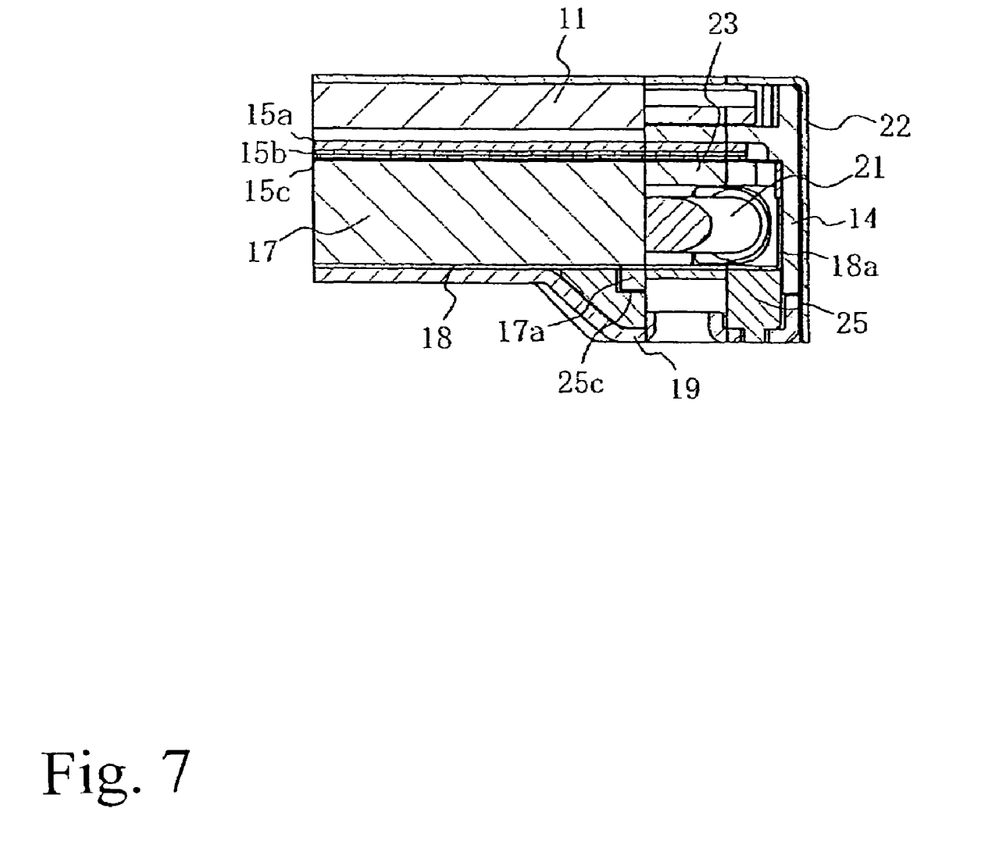
FIG. 7 is a sectional view of the line marked VII-VII in FIG. 2.

FIG. 1 is an exploded perspective view of an LC module representing one example of the present invention while FIG. 2 is a plane view of the back surface of the rear case of an embodiment of the LC module of the present invention. FIG. 3 is an enlarged plane view of a part of FIG. 2. FIG. 4 is an exploded perspective view showing the structure of the backlight part of the LC module. FIG. 5 is an exploded perspective view of a part of FIG. 4 viewed from the opposite direction. FIG. 6 is a perspective view showing the light guide plate and reflector plate in their assembled state. FIG. 7 is a sectional view of the line marked VII-VII in FIG. 2.

The example described here refers to an LC module used in a car navigation system.

FIG. 1 is an exploded perspective view showing the construction of an LC module 10 in a car navigation system, a description of which has been previously made. However, in the present example, as will be related in more detail later, the fitting parts 19a for fastening the LC module 10 to the car that are provided at the corners of the rear case 19 component of the LC module 10 are provided close to the corners by pressing inner sections of the rear case, without pressing the peripheral portions of the rear case, and the mounting brackets 20 for fastening the LC module to the car are installed onto the rear case 19 by screws that are screwed into screw holes 19b formed in the fitting parts 19a.

Thus, as shown in FIG. 2, the fitting parts 19a for fastening the LC module that are provided in the metallic rear case 19 are located as close as possible to the corners of the rear case 19, so that they will not obstruct the installation of the printed circuit board (not shown), which carries various ICs and parts, onto the rear case 19, and so as to secure space for a large printed circuit board.

In order to locate them as close as possible to the corners of the rear case 19, the fitting parts 19a are not entirely pressed to form the conventional, well-known circular dish shape, but are formed to have a shape where only their inner section 19c (forming roughly half of the periphery of the planar portion of the fitting parts 19a) is pressed into a sloping step form, and no such form is provided in the outer portion 19d that overlaps with the periphery of the rear case 19 and forms roughly the other half of the periphery of the planar portion, since pressing is not applied at such portion. As used herein, the term "pressing" refers to stamping a die into a metal sheet so as to form protuberances on its planar surface.

The fitting parts 19a have screw holes 19b in the planar portion 19e, which is partitioned into a step section 19c and a sidewall-less section 19d on the periphery of the rear case, each of which forms roughly half of the periphery of the planar portion. The outer portion of the screw holes 19b runs downward for a prescribed length in the direction of the LC panel 11, and screw threads are cut on the inner section of such downward-running cylindrical portions (not shown). The mounting brackets 20 for fastening the LC module are installed by being screwed into these cylindrical portions. The shape of the mounting brackets 20 is not limited to the kind shown in the drawing.

The fitting parts 19a have a screw hole 19b in their planar portion 19e, which is partitioned into a step section 19c and a sidewall-less section 19d on the periphery of the rear case 19, each of which forms roughly half of the periphery of the planar portion. The mounting brackets for fastening are installed to the rear case 19 by screws that are screwed via the screw holes 19b of the fitting parts 19a into the plastic support elements 25 installed into the depressions of the fitting parts 19a. The flexible printed circuit boards 12a and 12b wind to the rear and the side of the plastic frame 14, respectively, and are connected to a circuit board (not shown) installed on the back surface of the rear case 19. Moreover, this printed circuit board is covered by a metallic cover (not shown), with an insulating sheet interposed. Reference numeral 26 indicates a connector connected to the lamp cable 27.

FIG. 3, which is an enlarged plane view of the circled portion in FIG. 2, shows one of the fitting parts 19a partitioned by an obtuse-angled step 19c that is provided in each of the four corners of the rear case 19 for attachment of the LC module. No pressed step is provided in the section 19d, which lies along the margin of the rear case 19. A threaded screw hole 19b is provided in the planar portion 19e, which is partitioned into the step section 19c and the rear case periphery section 19d.

In order to locate them as close as possible to the corners of the rear case 19, the fitting parts 19a are not entirely pressed into the conventional, well-known circular dish shape, as mentioned earlier. The only support for the planar portion 19e is the step 19c, as the rear case periphery section 19d has no sidewall linking it to the planar portion 19e. Without the step 19c, the planar portion 19e would be in danger of being crushed when the screw in the screw hole is tightened. Accordingly in the present example, support elements 25 made of plastic are disposed at the corners on the inner face of the rear case to support the planar portion 19e. Alternatively, use could be made, for instance, of the sidewall of the front frame 22 to support the planar portion 19e at the rear case periphery section 19d, instead of deploying support elements 25 as in the present example. Since any step for supporting the planar portion 19e from the rear case periphery section 19d has been eliminated, the attaching parts 19a are brought as close as possible to the corners of the rear case.

In addition, a hole 19f is provided in the planar portion 19e as a means for locking the support element 25. A cut protuberance or the like could be provided instead of such hole 19f.

The configuration of the LC backlight part shall be described next with the aid of FIGS. 4 and 5. FIG. 4 is an exploded perspective view showing the structure of the backlight part of the LC module while FIG. 5 is an exploded perspective view of a part of FIG. 4 viewed from the opposite direction. Both drawings show the layout of the light guide plate 17, tubular lamp 21, reflector plate 18, support member 25 and rear case 19, viewed frontally. The tubular lamp 21—a U-shaped cold-cathode tube or similar item—is disposed around the periphery of the light guide plate 17—which together with the reflector plate 18 make up the backlight and, fitted into the frame 14 (see FIG. 1) along with the plurality of optical sheets 15a to 15c, is housed inside the rear case 19.

The light guide plate 17 is composed of transparent plastic sheets with a high level of light transmissibility, such as acrylate resin, polycarbonate, AS or PET, or of sheets of transparent glass. The light guide plate 17 is a roughly cuboid plate having an effective light emitting region that is slightly larger than the effective display region of the LC panel 11. On its periphery an eave-shaped section 23 is provided to serve as a housing 24 for the tubular lamp 21, etc. Around the edges of the light guide plate 17, beneath the eaves 23, a U-shaped tubular lamp 21 extending over three of the edges, for example, is disposed, while a cable 27 connected to the tubular lamp 21 is laid along the remaining edge. The front face of the light guide plate 17 is the light emitting surface thereof, upon which optical sheets 15a to 15c consisting of a diffuser sheet, polarizing sheet and lens sheet, or similar items, made of high light transmission translucent polycarbonate or similar material are provided, so as to evenly diffuse the light from the lamp's light source. On the reverse face of the light guide plate 17, a scattered dot pattern is screen-printed, scratches are applied or embossing or some other processing is performed to cause the diffused reflection of light.

Further, a reflector plate 18 composed of white polyester or a polyester film onto which an evaporated silver film has been applied, is disposed over the reverse face of the light guide plate 17. A raised portion 18a, formed by bending, that extends to the reverse face of the light guide plate 17 is disposed around the periphery of the reflector plate 18. The raised portion 18a is formed so as to envelop the tubular lamp 21 and its end is adhered to the end surface of the eaves 23 of the light guide plate 17 with double-sided tape or the like, thereby configuring a reflector for the tubular lamp 21.

As plainly viewed from FIGS. 4 and 5, the support elements 25 are bottomed spacers, each of which is made from resin and formed into a shape to match the shape of its corresponding fitting part 19a, having cylindrical depression 25a to receive the screw hole 19b. The cylindrical depression 25a is of a dual structure such that its diameter at the portion near its opening is larger than its diameter at its inner portion. To fasten the support element 25 to the rear case 19, the portion near the opening of the cylindrical depression 25a is press-fitted to the cylindrical portion of the screw hole 19b. The support element 25 is bottomed in order to prevent the entry of dust through the screw hole 19b of the fitting part. When the modular display is installed in a car, etc., it will reside in an extremely dusty environment, such that if dust enters continually into the backlight portion thereof, the quality of display will be adversely affected, as would cause the level of brightness to deteriorate, for example. Therefore, such mode of construction where the entry of dust can be prevented would be extremely effective for an LC module equipped with a backlight.

A locking means 25b which corresponds with the locking means 19f provided in the attaching parts 19a of the rear case 19, such as a protuberance or hole, is respectively formed on the support elements 25 for the purpose of positioning. After positioning has been executed by fitting the screw hole and such locking means together, the LC module 10 is assembled by fitting the rear case 19 into the plastic frame 14 housing the backlight. By means of such structure, the support elements 25 are inserted between the reflector plate 18 and the attaching parts 19a of the rear case 19.

FIG. 6 provides a perspective view of the light guide plate 17 and reflector plate 18 in their assembled state, seen from the reverse face of the reflector plate 18, so as to illustrate the relation between the support elements 25 and the reflector plate 18. On the underside of the light guide plate 17, a boss 17a that is integrated with the light guide plate resides for positional alignment with the reflector plate. The boss 17a passes through a hole 18b provided in the reflector plate 18, protrudes from the underside of the reflector plate 18, and is inserted into a boss hole 25g provided on the bottom surface of the support element 25. Thus, the reflector plate 18 is aligned by means of the boss 17a of the light guide plate and the support element 25 at each of its four corners. In this manner, positioning of the reflector plate 18 and light guide plate 17 is accurately executed, yielding a backlight in which the light guide plate 17, the tubular lamp 21 serving as the light source, and the reflector plate 18, are integrated and free from positional misalignment.

FIG. 7 is a sectional view of the line marked VII-VII of the circled portion in FIG. 2. The top part of the plastic frame 14 supports the LC panel 11, and the plurality of optical sheets 15a to 15c, the light guide plate 17, and the reflector plate 18 are fitted into its bottom part in the order given, and the assembly is then housed in the rear case 19. Assembly of the LC module 10 is completed by fitting a front frame 22 onto these assembled component elements from the front. As mentioned above, the support element 25 is inserted between the reflector plate 18 and the attaching part 19a of the rear case 19, while the boss 17a of the light guide plate 17 is made to pass through the reflector plate 18 and is inserted into the boss hole 25c of the support element 25 to align the reflector plate 18. In addition, the locking means 25b of the support element 25 is fitted into the hole 19f of the rear case 19. Under the eaves 23 of the light guide plate, the tubular lamp 21 that serves as the backlight's light source is disposed face-to-face with the end surface of the light guide plate, and is fastened when the end surface of the raised portion 18a of the reflector plate, which covers its back and side surfaces, is adhered to the end surface of the eaves 23 of the light guide plate with double-sided tape.

In this manner, if the end surface of the reflector plate 18 is adhered to the end surface of the eaves 23 (which partition out the housing 24 for the tubular lamp 21), the light guide plate 17 and reflector plate 18 will likely be dislocated even under normal circumstances, causing difficulties. In the present example however, the reflector plate 18 is aligned by means of the boss 17a. Accordingly, the fastening work can be carried out with ease, and the incidence of uneven light due to dislocation of the reflector plate can be avoided.

In addition, aside from aligning the reflector plate 18, the boss 17a also serves to position the light guide plate 17 by controlling its movement, and to prevent breakage of the tubular lamp 21. In an LC module intended for vehicle installation where mobile or other equipment is subjected to high levels of vibration, the tubular lamp 21 (which is the light source) is prone to flex and the light guide plate is caused to move due to vibration, giving rise to the risk that the tubular lamp will break. But by controlling the movement of the light guide plate 17, such hazard can be reduced, and in addition it would be possible to keep the misalignment of the relative positions of the light guide plate 17, reflector plate 18 and reflector that results from temperature variation due to fluctuations in the ambient temperature as well as the turning on and off of the tubular lamp 21 (the light source) at a low level.

The LC module 10 described above has fitting parts 19a that eliminate any corner portion sidewalls straddling adjacent edges of the four corners of the rear case 19, and the module is stably installed on the mounting section of the navigation system by means of mounting brackets 20 attached to the back surfaces of the fitting parts 19a. As a result, installation of the module does not take up space, and it can be reliably firmly installed.

The fitting parts 19a can be designed to have any appropriate shape, regardless of the foregoing example. The boss provided on the light guide plate can be a protuberance of some shape other than a bar shape, but it must be formed at a place where it will not affect the effective light emitting region in the corners of the reflector plate, and additionally, it must pass through the reflector plate and fit into the support element 25. Similarly, the shape of the mounting brackets 20 can be altered as may be appropriate to conform with the place of installation.

Further, while the fitting parts need not necessarily be formed in the four corners of the reflector plate, such would be preferable since the module will be applied to a car navigation system, etc., that is used while the car is in motion, in order to install the module robustly.

Furthermore, although the example of a display module described above is an LC module equipped with a light source residing behind its display panel, the application of the present invention is by no means limited to LC modules. The form of the fitting parts of the present invention can equally apply to other display panels such as organic electroluminescence panels, enabling them to be installed compactly and also allows for greater freedom in designing the control board disposed on the back surface thereof.

What is claimed is:

1. A display module equipped with a display panel and a rear case, having side surfaces and a back surface, comprising:
   fitting parts for fastening the display module that are provided in the corners of the back surface of the rear case via a pressing process, such pressings being formed at inner sections of the rear case, and not at its periphery, wherein
   support elements are installed in the fitting parts, and mounting brackets for fastening are installed to the rear case by screws that are screwed into screw holes formed in the fitting parts and,
   the screw holes are located in a planar portion of the fitting parts, such planar portion being partitioned into a stepped rear case inner section and a sidewall-less rear case periphery section, each of which forms roughly half of the periphery of the planar portion.

2. A liquid crystal display module equipped with a liquid crystal panel and a rear case having side surfaces and a back surface, housing a reflector plate and a light source, comprising:
   fitting parts for fastening the liquid crystal display module that are provided in the corners of the back surface of the rear case via a pressing process, such pressings being formed at inner sections of the rear case, and not at its periphery, wherein
   support members are installed in the fitting parts, and mounting brackets for fastening are installed to the rear case by screws that are screwed into screw holes formed in the fitting parts, and
   the screw holes are located in the planar portion of the fitting parts, such planar portion being partitioned into a stepped rear case inner section and a sidewall-less rear case periphery section, each of which forms roughly half of the periphery of the planar portion.

3. A liquid crystal display module, equipped with a liquid crystal panel and a rear case having side surfaces and a back surface, housing a reflector plate and a light source, comprising:

fitting parts for fastening the liquid crystal display module that are provided in the corners of the back surface of the rear case via a pressing process, such pressings being formed at inner sections of the rear case, and not at its periphery, wherein
support members are installed in the fitting parts, and mounting brackets for fastening are installed to the rear case by screws that are screwed into screw holes formed in the fitting parts, and the support members are bottomed spacers formed with cylindrical depressions for receiving screws, and are inserted between the fitting parts and the reflector plate.

* * * * *